(12) United States Patent
Hersant

(10) Patent No.: US 12,228,155 B2
(45) Date of Patent: Feb. 18, 2025

(54) SEALING PLUG

(71) Applicant: AVDEL UK LIMITED, Sheffield (GB)

(72) Inventor: Carl Hersant, Letchworth Garden City (GB)

(73) Assignee: Avdel UK Limited, Sheffield (GB)

( * ) Notice: Subject to any disclaimer, the term of this patent is extended or adjusted under 35 U.S.C. 154(b) by 212 days.

(21) Appl. No.: 17/655,639

(22) Filed: Mar. 21, 2022

(65) Prior Publication Data

US 2022/0213916 A1   Jul. 7, 2022

Related U.S. Application Data

(63) Continuation of application No. PCT/EP2020/072908, filed on Aug. 14, 2020.

(30) Foreign Application Priority Data

Nov. 7, 2019 (GB) .................................... 1916187

(51) Int. Cl.
| | | |
|---|---|---|
| *F16L 55/132* | (2006.01) | |
| *F16B 19/10* | (2006.01) | |
| *F16J 15/06* | (2006.01) | |
| *F16L 55/11* | (2006.01) | |

(52) U.S. Cl.
CPC ......... *F16B 19/1054* (2013.01); *F16J 15/062* (2013.01); *F16L 55/1108* (2013.01); *F16L 55/132* (2013.01)

(58) Field of Classification Search
CPC ....... F16L 55/13; F16L 55/132; F16B 19/054; F16B 19/1045

USPC ......... 411/34, 43; 220/234, 235, 238; 4/295; 138/89

See application file for complete search history.

(56) References Cited

U.S. PATENT DOCUMENTS 3,257,890 A * 6/1966 Ludwig ............... F16B 19/1054
411/43
3,286,580 A * 11/1966 Jeal ........................ B21J 15/043
411/41

(Continued)

FOREIGN PATENT DOCUMENTS

| GB | 1413592 A | 11/1975 |
| GB | 2362201 B | 4/2004 |

(Continued)

OTHER PUBLICATIONS

International Search Report and Written Opinion Dated Nov. 17, 2020 cited in corresponding PCT Application No. PCT/EP2020/072908.

(Continued)

*Primary Examiner* — Flemming Saether
(74) *Attorney, Agent, or Firm* — Kofi A. Schulterbrandt

(57) ABSTRACT

A sealing plug comprises the combination of a stem and sleeve, in which the stem is designed to have an external taper such that, on installation of the plug by a setting tool, sleeve material flows into a gap between the sleeve and taper to assist with locking the sleeve and stem together. Furthermore, the tool nose piece has a conical taper designed to cause sleeve material to flow, initially on installation, radially outward to effect locking of the plug into a blind hole into which it is being installed.

8 Claims, 15 Drawing Sheets

(56) References Cited

U.S. PATENT DOCUMENTS

| | | | | |
|---|---|---|---|---|
| 3,414,965 | A | * | 12/1968 | Siebol ................. F16B 19/1054 29/523 |
| 4,639,174 | A | | 1/1987 | Denham et al. |
| 4,958,971 | A | * | 9/1990 | Lacey ................. F16B 19/1054 411/69 |
| 6,213,699 | B1 | * | 4/2001 | Sadri ................... F16B 19/1054 411/69 |
| 7,150,593 | B2 | * | 12/2006 | Roberts ................ F16L 55/132 411/371.1 |
| 8,491,243 | B2 | * | 7/2013 | Smith ................. F16B 19/1054 411/509 |
| 2019/0032695 | A1 | * | 1/2019 | Vovan ................. F16B 19/1063 |

FOREIGN PATENT DOCUMENTS

| | | | |
|---|---|---|---|
| GB | 2381301 | B | 1/2005 |
| GB | 2464674 | B | 9/2010 |
| GB | 2457105 | B | 9/2011 |

OTHER PUBLICATIONS

India First Exam Report dated Sep. 6, 2022 cited in corresponding India Application No. 202217029594.

* cited by examiner

SEALING PLUG

CROSS-REFERENCE TO RELATED APPLICATIONS

This application is a continuation of International Application PCT/EP2020/072908 with an international filing date of Aug. 14, 2020 which claims priority from United Kingdom Patent Application No. GB1916187.6, filed Nov. 7, 2019, the disclosure of which is incorporated herein by reference in its entirety.

FIELD OF THE INVENTION

The present invention relates to sealing plugs as used in blind installation environments and has particular, although not exclusive, relevance to such unthreaded plugs as may be used in hydraulic fluid sealing and flow control applications. The invention also relates to installation tools for use with these blind sealing plugs and methods of application of such plugs. Blind installation means that access to a hole in which the sealing plug is to be inserted (and provide fluid-tight sealing therefor) is only possible from one side.

BACKGROUND OF THE INVENTION

Blind sealing plugs generally operate on the principle of radial expansion of material within the blind hole. The radial expansion of the plug blocks the hole thereby to prevent fluid flow past the sealed plug. There are generally two types of expansion actuation: pushing and pulling. In each case, a relatively harder material than that which expands within the hole is used to cause the relatively soft, expanding material to flow radially outwards within the hole. With the pushing method, the pusher is sometimes removed from the hole after the plug has been set; whereas, with the pulling method, the puller is captive within the hole after setting. This usually means the puller has some form of structural weakness formed therein so that it fractures under a defined load thereby separating the puller from that which actuates it, thus leaving the plug within the hole.

An example of a known pulling type of sealing plug is disclosed in EP-A-1,440,272. This discloses a form of sealing plug constructed from a sleeve held around a stem. The stem has a head formed from material which is relatively harder than the material of the sleeve. The head carries an annular projection for penetration into the sleeve material on setting of the plug within a blind hole. The annular projection, once set within the sleeve, provides a fluid-tight seal between the head and the sleeve of the plug when set within the hole.

Whilst this type of sealing plug functions effectively, it has been found that its construction may be improved upon in order to provide a plug whose characteristics for setting within the blind hole are more controlled such that a progressive hole-filling action by the deforming sleeve is achieved and that the sleeve has no propensity to move axially within the hole during setting, as could be the case with known sealing plugs. This would also permit better containment of the sleeve material as it would be forced against the hole surface during setting and so be able to resist very high pressures, such as oil at over 1,600 bar, without the seal being ejected from the hole.

It is an object of the present invention to provide a sealing plug which overcomes these disadvantages and to provide a stem which is better retained within the sleeve both during the setting operation and thereafter.

SUMMARY OF THE INVENTION

Accordingly, the present invention provides, in one of its aspects, a sealing plug for blind installation within a suitable hole, thereby to plug and seal the hole, the sealing plug comprising: a generally cylindrical hollow sleeve defining a first axis and having a given outer diameter; a stem comprising a proximal cylindrical projection, a distal head and a central portion located between the proximal cylindrical projection and the distal head, the stem head having an outer diameter which is greater than the outer diameter of the central portion, and wherein the outer diameter of the central portion is greater than the outer diameter of the stem proximal cylindrical projection, and wherein the stem defines a second axis; the stem head being formed of a material which is harder than the material of the sleeve; the stem central portion, when within the sleeve, is arranged to be held therewithin by frictional engagement between an outer part of the stem central portion and an inner part of the sleeve such that the first and second axes are co-axial; the sealing plug characterised in that the outer diameter of the stem central portion tapers in the direction from the stem proximal cylindrical projection to the stem distal head, with respect to the axis of the stem, to a minimum central portion diameter at the point where the stem central portion meets the stem head.

Preferably the stem head has an annular shoulder adjacent the stem central portion, which annular shoulder is inclined at an acute angle relative to a radius to the second axis. This aids control of radial flow of sleeve material during setting of the plug.

In a preferred embodiment the annular shoulder inclination forms a concave region facing the stem central portion. This again aids with material flow during setting of the sealing plug.

Preferably the shoulder angle of inclination relative to a radius to the second axis is between 5° and 25°, more preferably between 10° and 15° and even more preferably the shoulder angle of inclination is 14°.

Advantageously the stem head has formed thereon an annular protrusion facing the stem central portion. This annular protrusion, which may be in the form of a projecting ring, may be arranged to engage with the hollow sleeve. This provides a better fluid-tight seal between the stem head and the sleeve than if no such annular protrusion were present.

In another aspect, the present invention provides a method of setting a sealing plug, as defined above and in the appendant claims.

Other features of the invention are also set out in the specification.

BRIEF DESCRIPTION OF THE DRAWINGS

A specific embodiment of the present invention will now be described, by way of example only and with reference to the accompanying drawings, of which.

DETAILED DESCRIPTION

Figure 1:
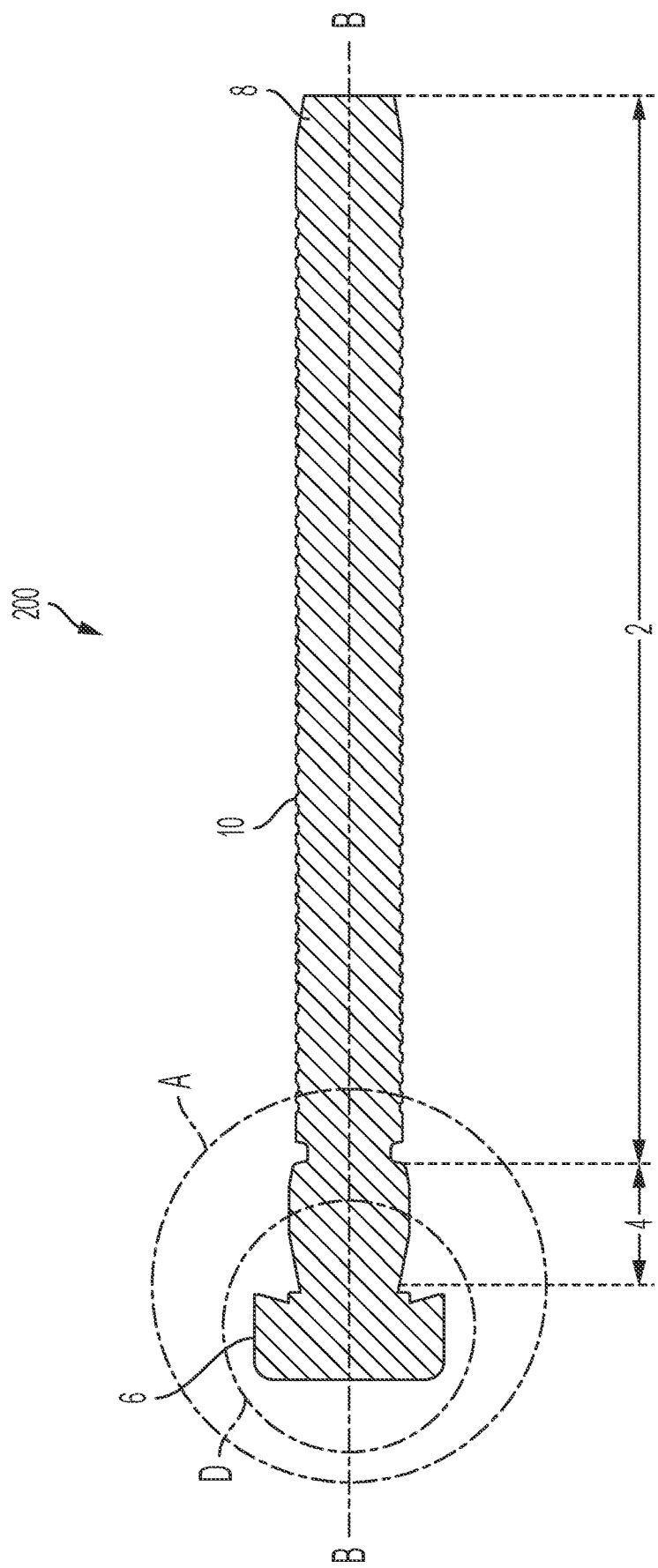
FIG. 1 shows an axial section through a stem of a sealing plug in accordance with the present invention.
Figure 2:
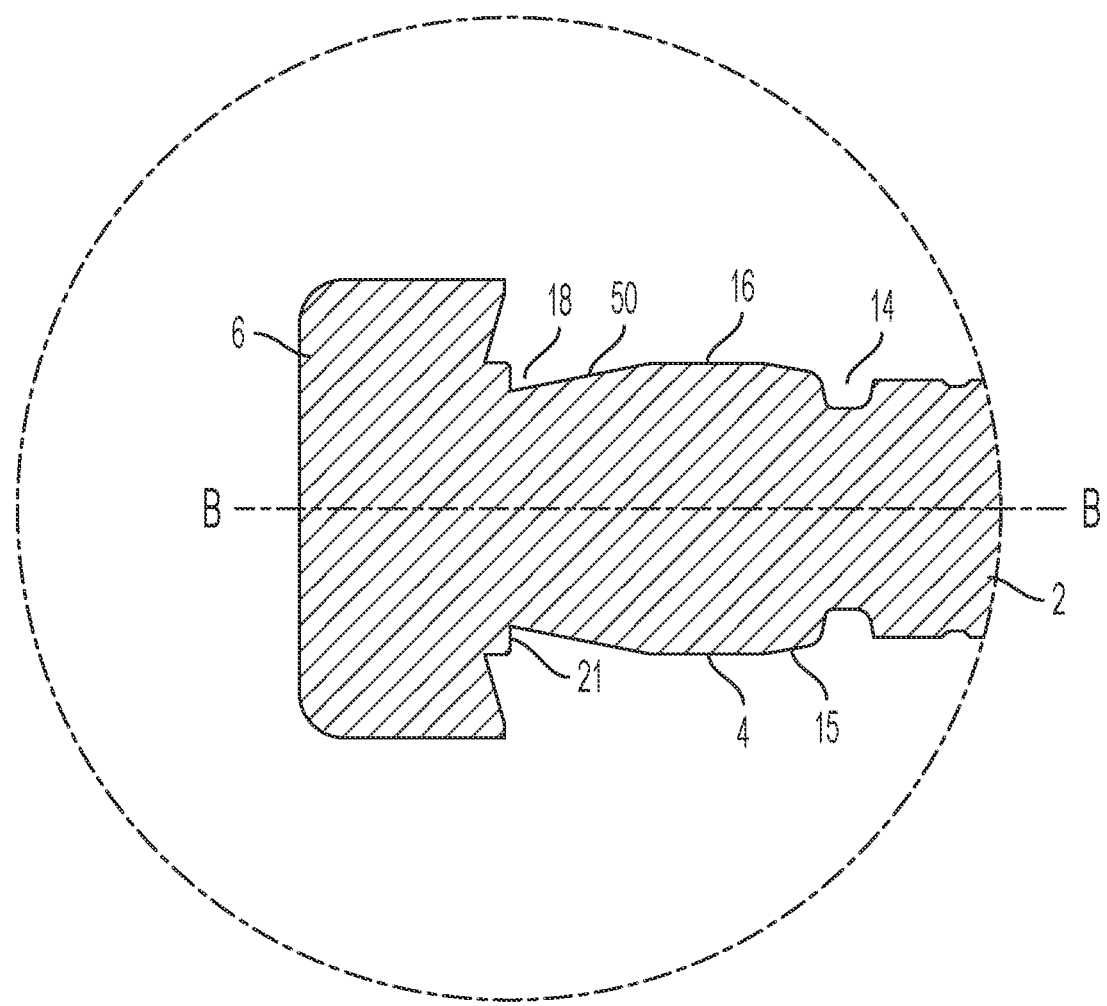
FIG. 2 shows a detailed view, at enlarged portion A, of FIG. 1.

Referring firstly to FIGS. 1 and 2 it can be seen that a stem 200 in accordance with the present invention comprises three main regions: a proximal cylindrical projection 2, a central portion 4 and a distal head end 6. The stem 200 may be formed as a single unit, or from several elements. In this example, the stem is formed as a single unit of heat-treated medium carbon steel. The three regions of the stem each have different outer diameters. The head 6 has a larger outer diameter than the central region 4. The central region 4 has a larger outer diameter than the proximal cylindrical projection 2. The reason for these different outer diameters will be explained below. The length of the stem 200 is not relevant to the present invention. Nor is the method by which the stem is gripped for placement of the sealing plug of the present invention.

The proximal cylindrical projection 2 terminates in an inwardly tapering end 8 so that the stem may be inserted more easily into a setting tool, as will be explained below. To further aid setting of the plug, the stem, in this example, carries a series of annular grooves 10 along its axial extent. The annular grooves enable the setting tool efficiently to grip and pull upon the projection 2 during installation of the plug.

Figure 3:
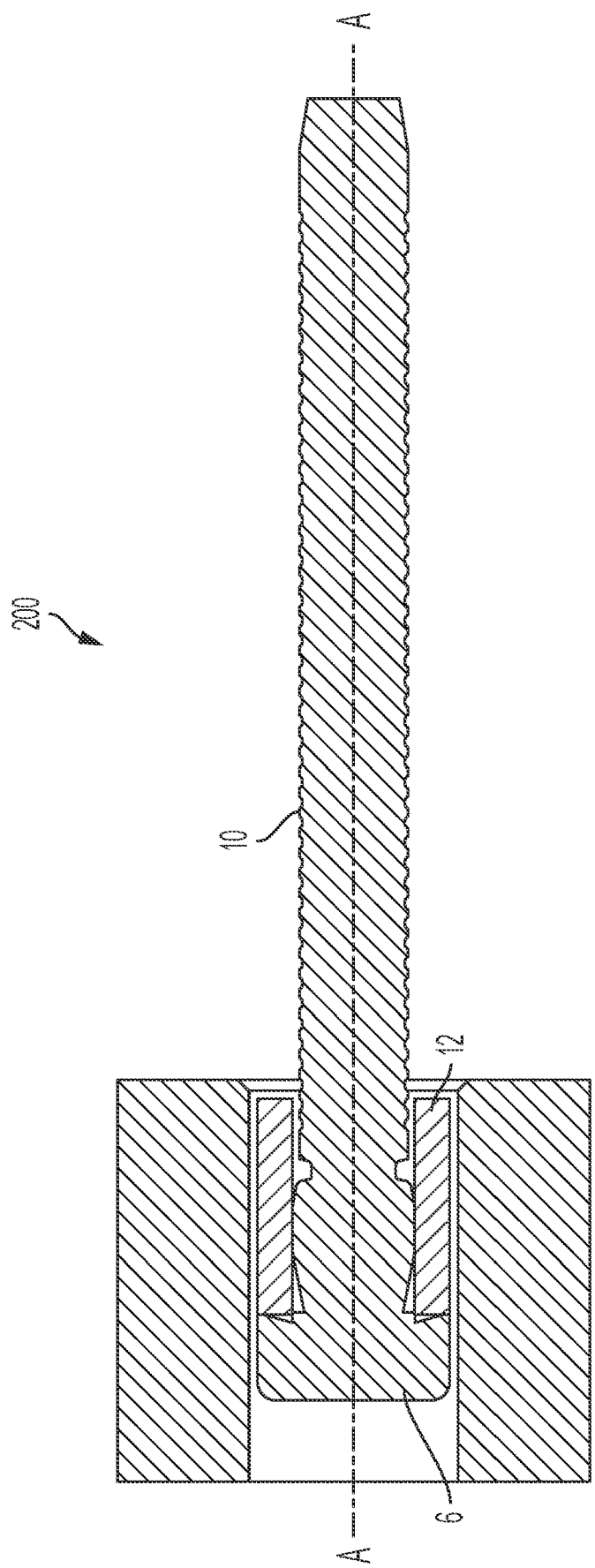
FIG. 3 shows a section through an unset sealing plug in accordance with the present invention therein.

As can be seen from FIG. 3, the stem 200 is arranged to sit within an outer sleeve 12, formed of softer material than that of the stem 200. In this example, the sleeve 12 is formed from annealed aluminium alloy 6061. The sleeve 12 defines an axis A-A. The stem 200 defines a second axis, B-B (see FIG. 2).

The sealing plug is formed from the union of the sleeve 12 and stem 200, such that the stem 200 sits within the sleeve 12 and is co-axial therewith. In FIG. 3, only axis A-A is shown for clarity, but those skilled in the art will appreciate that both axes A-A and B-B are coaxial; in this example, coincident.

Referring to FIG. 2, the structure of the central region 4 can be seen. The central region includes a weakened zone 14 which, in known manner, provides the location for a stem 200 to break during its installation process once sufficient axial load is applied thereto. The force at which the stem will break at zone 14 is dictated predominantly by the radial depth of the zone 14, as is apparent to those skilled in the art.

A maximum outer diameter of the central zone 4 occurs at 16. The diameter here is chosen to be at least the same as the inner diameter of sleeve 12 so that, when the stem 200 is inserted into the sleeve 12, an interference fit exists to hold the stem in place within the sleeve 12. This interference fit ensures that the stem 200 and sleeve 12 are coaxial and that relative axial movement is avoided as the assembly is handled.

Situated between the zone 14 and maximum diameter 16 of the central zone 4 is tapered region 15. This taper 15 assists with the assembly of the sleeve 12 onto the stem 200. The taper 15 is radially inward from the maximum diameter 16 to the weakened region 14, the purpose of which is to provide a lead-in to enable the assembly of the sleeve 12 onto the stem 200. This is an assembly aid during formation of the plug (being the combination of the stem 200 and sleeve 12) and plays no part during setting of the sealing plug in use.

Moving axially along B-B from the proximal cylindrical projection end 2 to the distal head 6 end of the stem (from the right to the left when viewing FIG. 2), the outer diameter of the central region 4 tapers radially inwardly at 50 to a minimum diameter point 18. The purpose of this taper along the central region 4 will also be explained below. An inner shoulder 21 is present between the minimum diameter point 18 and head 6. Inner shoulder 21 is formed as part of the stem head 6 at its radially inner portion at the junction with the minimum diameter position 18. Whilst the inner shoulder 21 is shown in this example, it is a preferable feature and need not employed. The present invention functions sufficiently even without such a shoulder 21, as will be appreciated by those skilled in the art.

Figure 5:
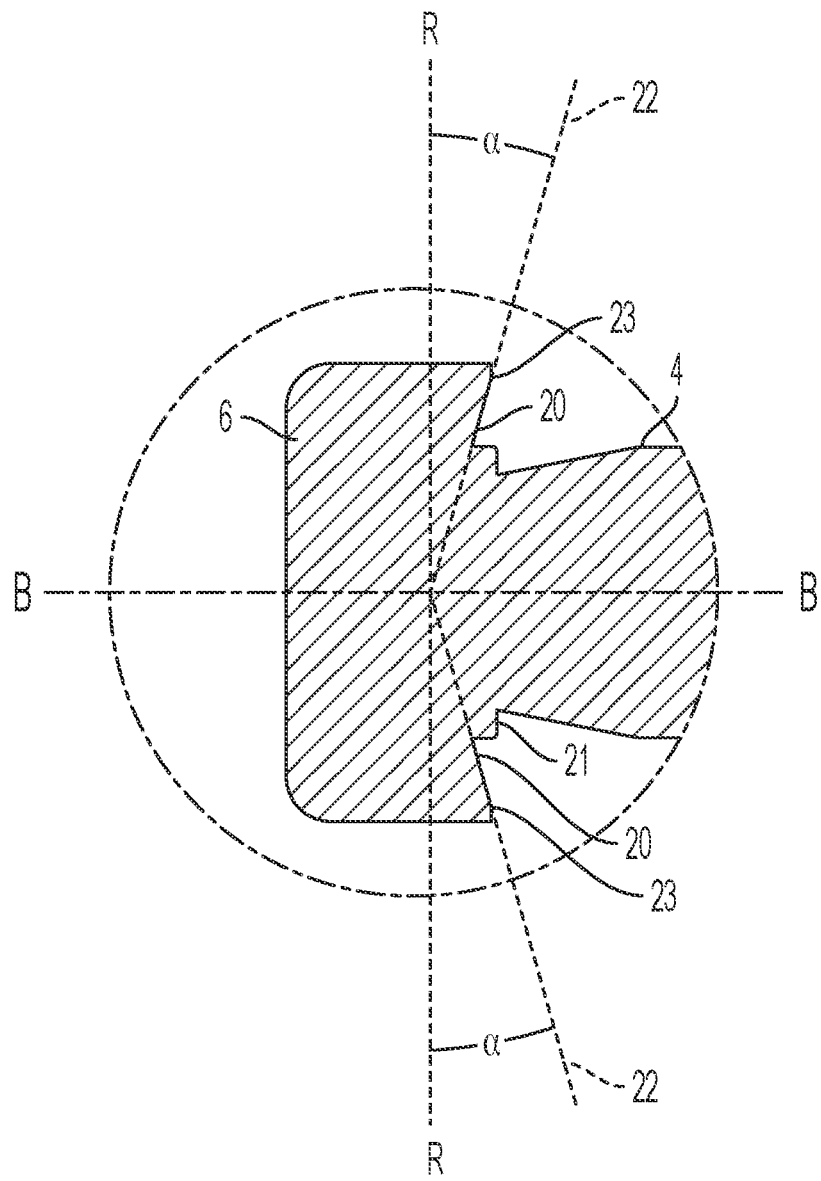
FIG. 5 shows a detailed section, at enlarged portion D, of the stem head FIG. 1.

Referring now also to FIG. 5 it can be seen that the stem head 6 is formed with an annular shoulder 20 adjacent the central region 4. In this example, the shoulder 20 abuts the inner shoulder 21 at the minimum diameter point 18. The shoulder 20 sits along a surface 22 which is inclined at an acute angle, $\alpha$, to a radius R-R to the axis B-B. The angle $\alpha$ is chosen to be in the range 5°-20°; preferably 10° and 15°. In this example, the angle is 14°. Whatever the angle $\alpha$, it is chosen to ensure that the annular shoulder 20 inclination to the radius R-R forms a concave region facing the stem central portion 4. In this example, the concave region extends to the outer rim of the shoulder at 23. However, it need not extend completely radially from the central axis B-B to the circumferential periphery of the stem head 6. This concave region may extend only partially between the axial centre and radial periphery and even in sections therebetween (as opposed to a single, unbroken length). Additionally, the surface 20 defining this concave region need not be straight. The purpose of this concave region will be explained below.

Figure 4:
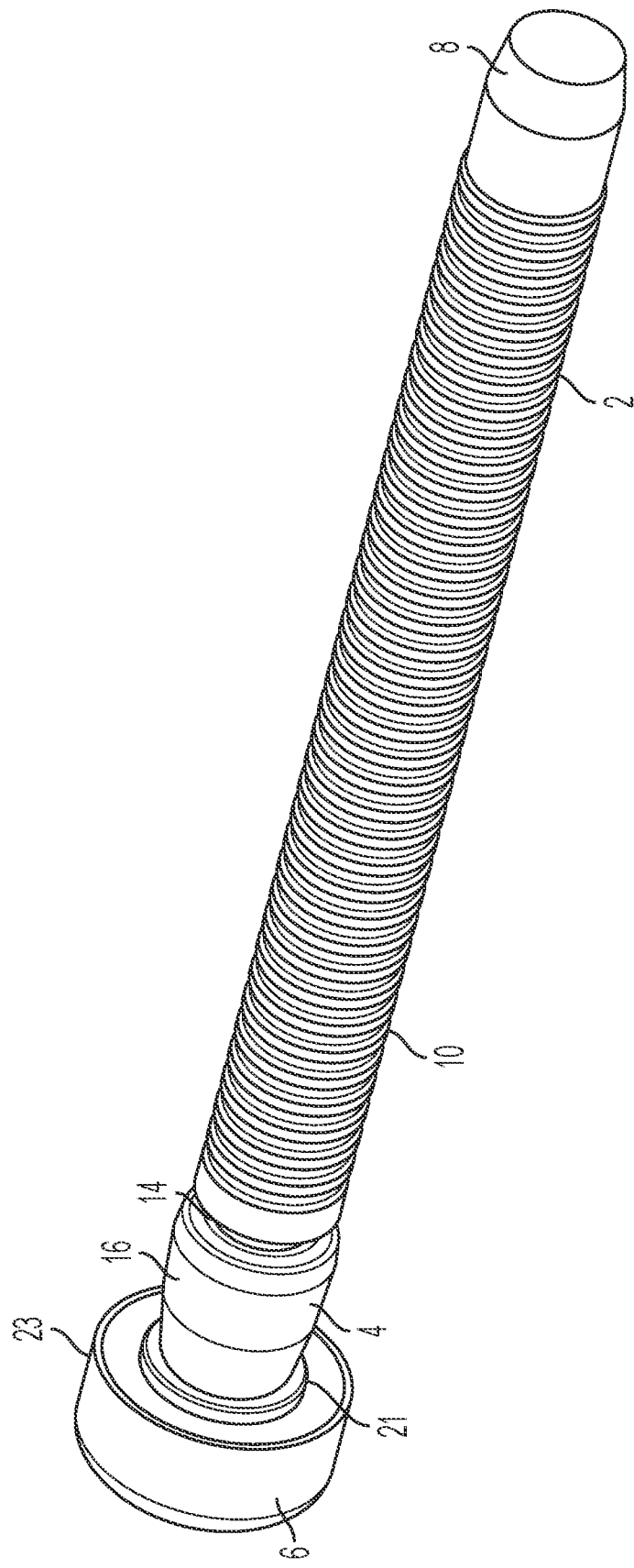
FIG. 4 shows an isometric view of the stem of FIG. 1.

An isometric view of the stem 200 can be seen at FIG. 4.

Reference now to the series of FIGS. 6-11 illustrates how the sealing plug of FIGS. 1-5 is set within a blind hole 34. In the example shown, the hole 34 is formed in a workpiece 36 (such as an hydraulic valve block).

Figure 6:
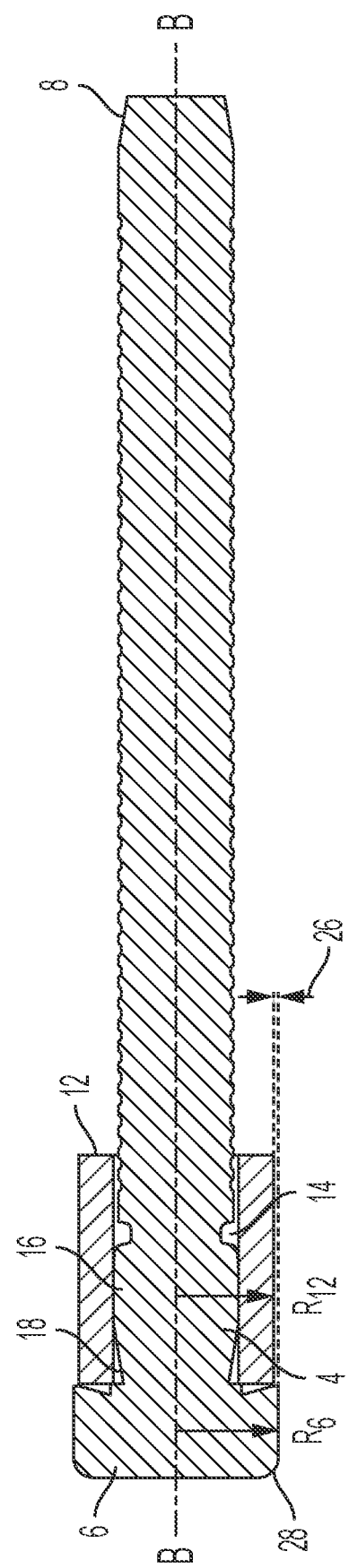
FIG. 6 illustrates schematically a complete sealing plug before installation.

The illustration of FIG. 6 shows the complete sealing plug formed from the stem 200 held within the sleeve 12. As discussed above, the stem 200 is held inside the sleeve 12 because of the interference fit therebetween, resulting from the choice of outer diameter 16 of the stem central region 4 and the inner diameter of the sleeve 12.

It can be seen that a radius drawn to the outer diameter of the stem head 6, $R_6$, is greater than a radius to the outer diameter, $R_{12}$, of the sleeve 12. This is chosen because, when the plug is inserted into the blind hole 34 to be sealed, the sleeve 12 (being made, in this example, from a, relatively, softer aluminium material than the steel of the stem) may be damaged by the material in which the hole is formed during the process of inserting the plug into the hole. This is especially so if the material in which the hole is formed is, say, steel. By ensuring that $R_6$ is greater than $R_{12}$, this risk of sleeve damage is obviated. In the present example, the difference between $R_6$ and $R_{12}$, shown as reference numeral 26, is 0.1 mm, but any suitable difference may be employed. As can be seen from the left-hand side of FIG. 6, to aid insertion of the stem head 6 into the hole (not shown), the end of the head 6 may be rounded 28, or chamfered, so that the head 6 readily passes into and centralises within, the hole 34 on insertion thereinto.

Figure 7:
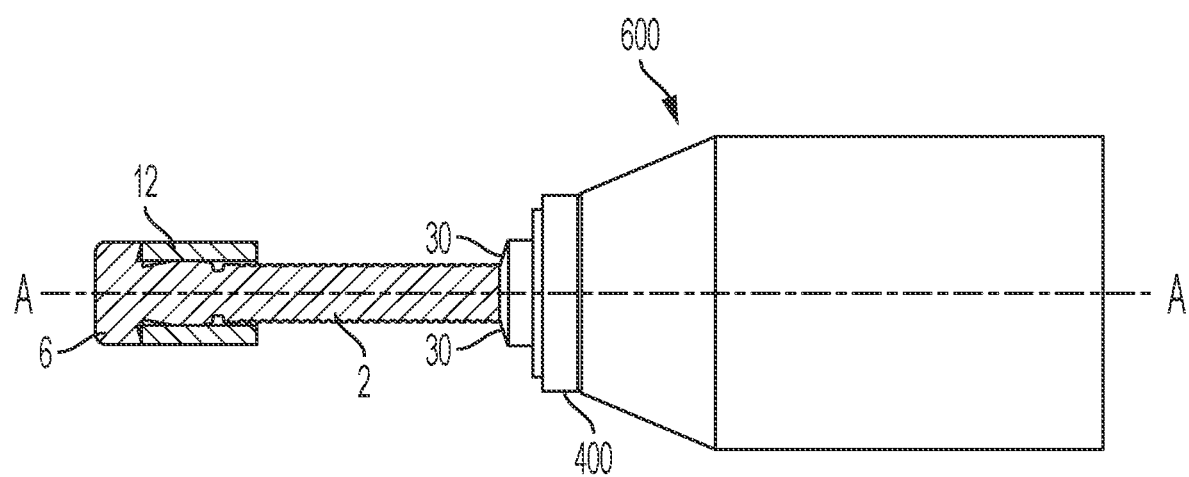
FIG. 7 illustrates schematically the sealing plug of FIG. 6 when starting to be introduced into a setting tool.

Reference now to FIG. 7 shows the proximal cylindrical projection 2 being inserted into a nosepiece 400 of a setting tool 600. The setting tool 600 will not be further described here, as those skilled in the art understand and appreciate how such tools operate in order to set blind sealing plugs. It is sufficient to say that the purpose of the tool 600 is to grip and then apply an axial force to the projection 2, whilst holding the sleeve 12 against an axial movement, so that movement of the head 6 relative to and towards the sleeve 12 occurs. The front face 30 of nosepiece 400 is tapered and shown in this example as a convex conical form, as will be explained below.

Figure 8:
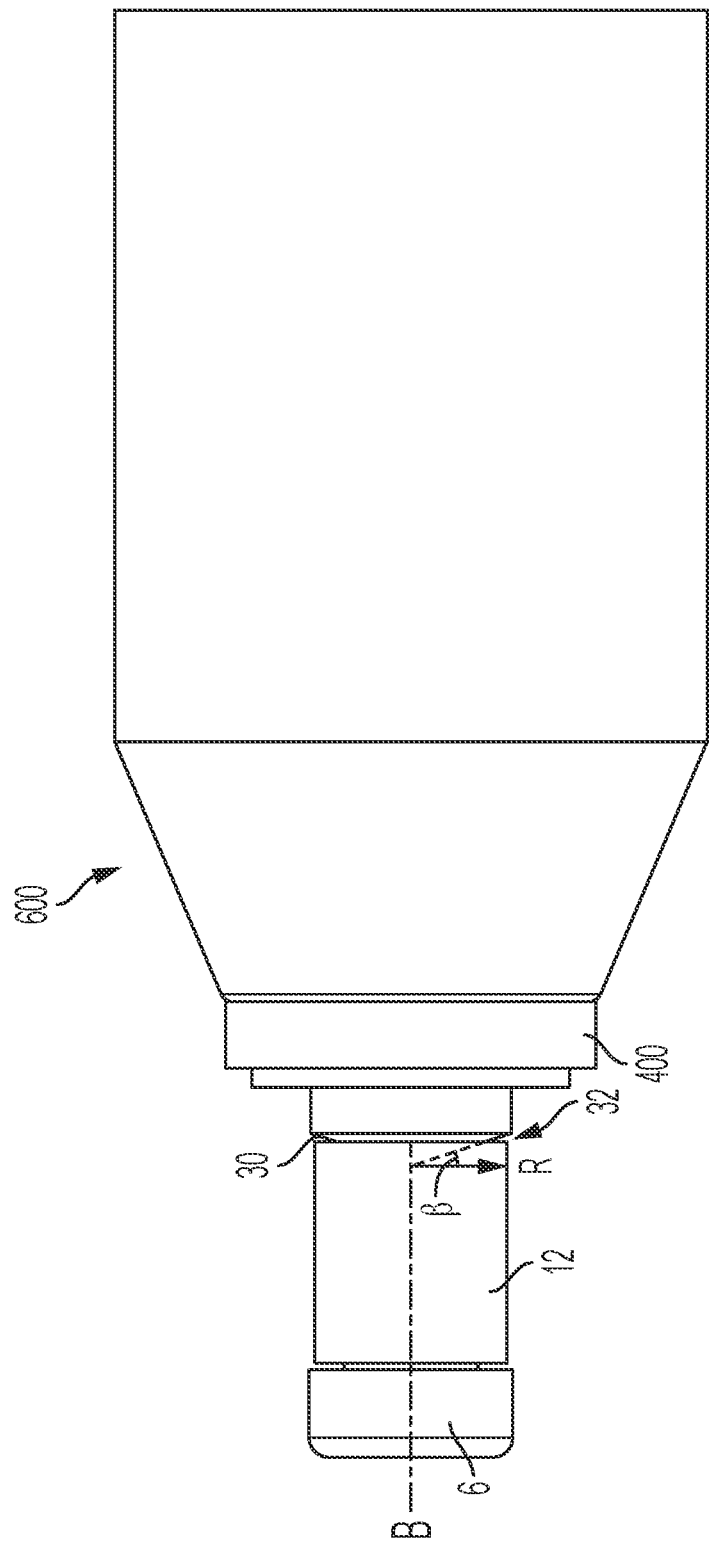
FIG. 8 shows the commencement of installation of the sealing plug by the setting tool.

FIG. 8 shows the position where the projection 2 is drawn fully into the tool 600 via nosepiece 400 such that the tapered face 30 abuts the sleeve 12. Typically, a vacuum advance mechanism pulls projection 2 into the tool and holds sleeve 12 against the face 30. The reason for this abutment between the face 30 and sleeve 12 is to prevent axial movement of this end of the sleeve 12 towards the tool 600 during setting of the plug. The tapered face 30 of the nosepiece 400 is arranged to provide a convex conical surface towards the sleeve 12. The angle, β, made by the taper relative to the radius, R, of the stem 200 is between 10°-20°; preferably 14°-16°. In this example, the angle is 15°. This means there is a tapered gap 32 formed between the face 30 and sleeve 12, the purpose of which will be explained below.

Figure 9:
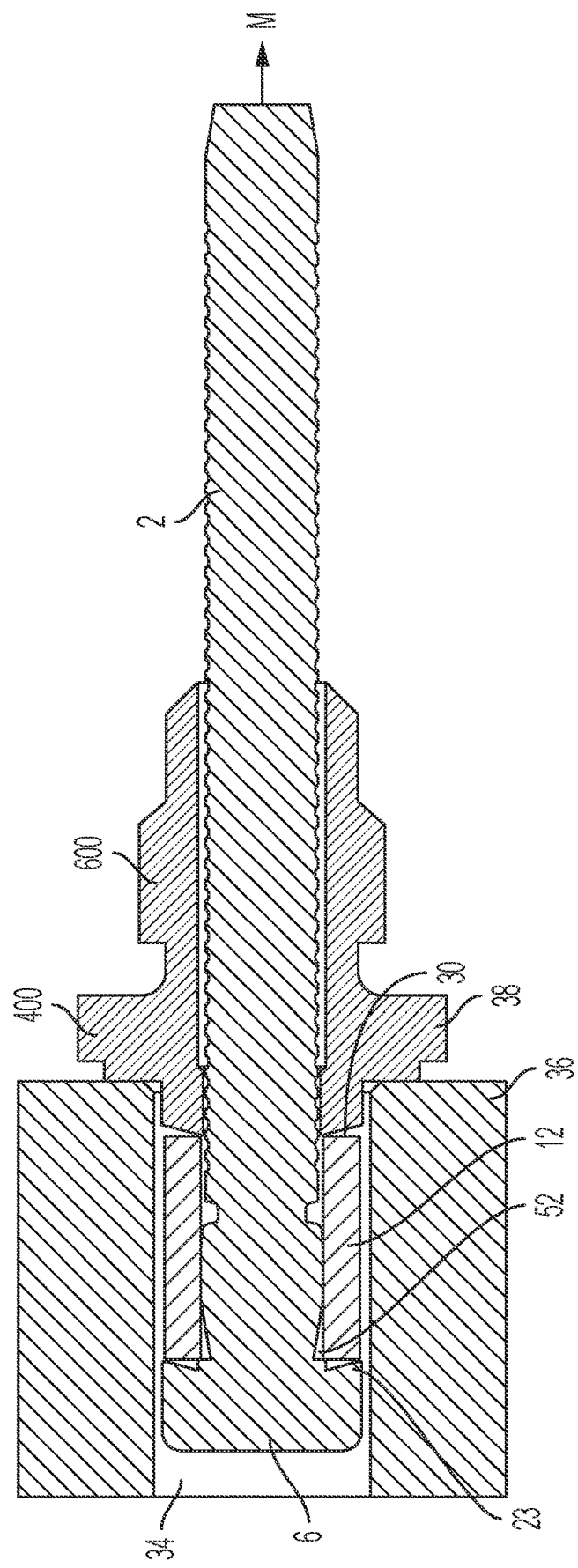
FIG. 9 shows the illustration of FIG. 8 in sectional detail.
Figure 10A:
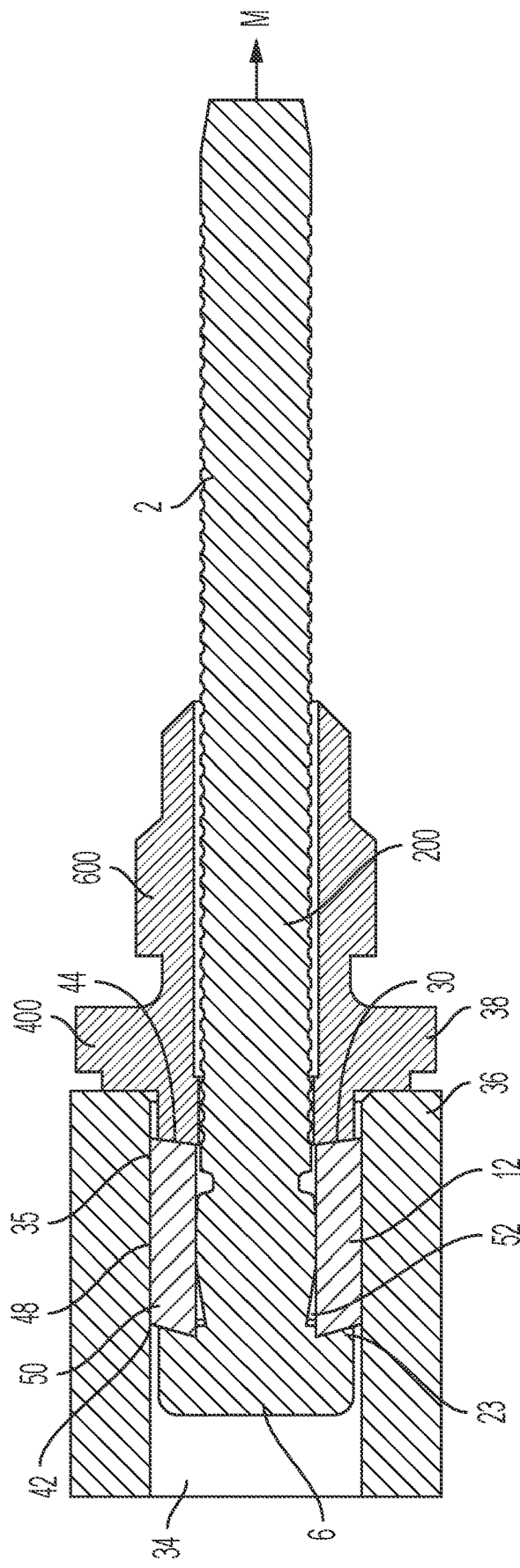
FIGS. 10(a)-(d) illustrate schematically the sequential stages of installing of a sealing plug in accordance with the present invention.
Figure 10B:
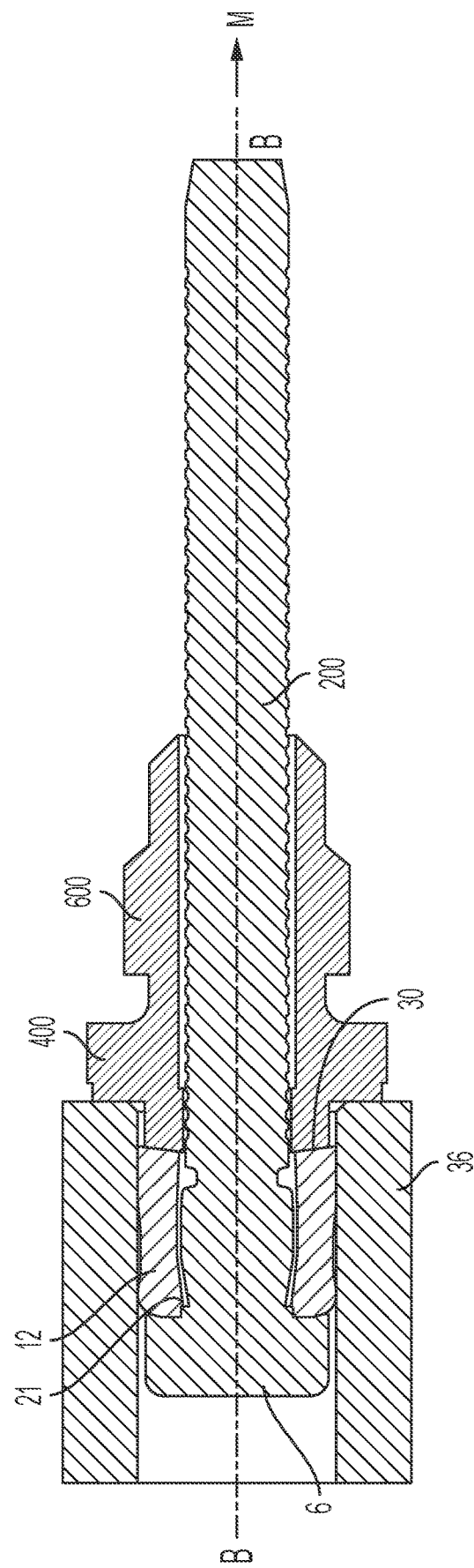
Figure 10C:
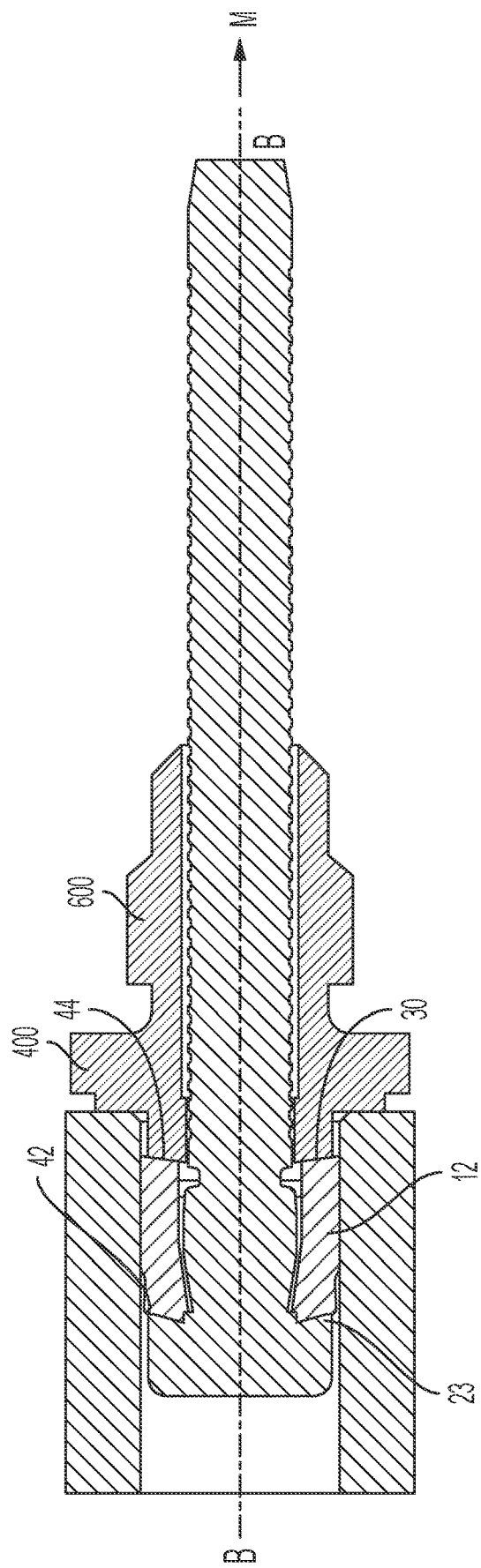
Figure 10D:
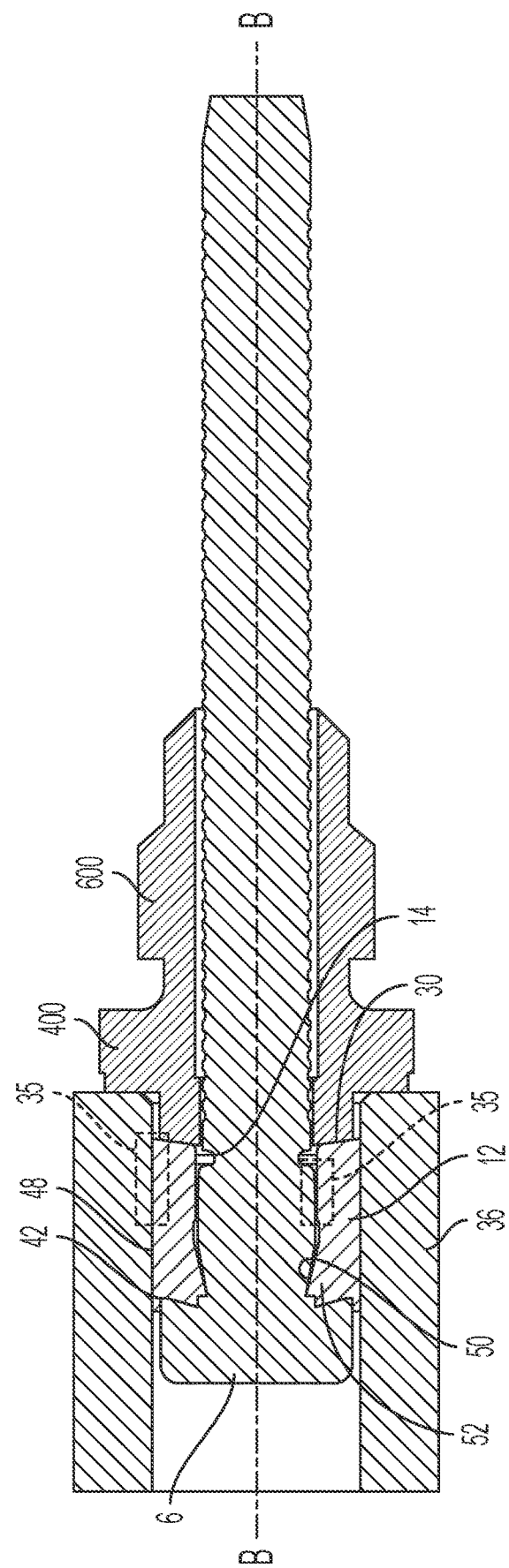

Reference now to FIG. 9 shows that a front member 38 of the tool 600 is formed as an annular shoulder on the nosepiece 400 and engages with (and contacts) the face of the workpiece 36 in addition to the tapered face 30 being in engagement with the sleeve 12 within the hole 34.

In order to set the plug, the tool 600 applies an axial force to the projection 2 (towards the right-hand side of FIG. 9), in known manner.

Reference now to FIGS. 10(*a*)-(*d*) illustrate the consequences of this operation. In FIG. 10(*a*), the slight, commencing, axial force applied by the tool to the stem 200 is insufficient to move the stem relative to the sleeve 12.

Once the force applied by the tool 600 to the stem 200 is sufficient to cause relative movement between the stem and the sleeve 12, then because the front member 38 of the nosepiece 400 of the tool 600 abuts and is held positively against the workpiece 36, relative movement between the tool 600 and workpiece 36 is prevented. The only movement permitted, therefore, is that of the stem 200 within the hole 34 (towards the right of the figure, as shown by arrow M).

The consequence of this stem 200 movement is that the stem head 6 is pulled into engagement with the left-hand side of sleeve 12. The initial contact between the stem head 6 and the sleeve 12 is that of the inner shoulder 21. Because inner shoulder 21 is formed from the stem head 6 material (here steel) and due to the material of the sleeve 12 being softer than this (in this example, the sleeve material being aluminium), then the protruding outer edge of shoulder 21 penetrates into the end of sleeve 12. This sleeve penetration is part of the sealing effect. This is the situation shown in FIG. 10(*b*).

The next contact, shown in FIG. 10(*c*), as the movement of the stem head 6 continues due to the axial pull force of the setting tool 600, is between the stem head 6 annular outer rim 23 and the radially outer part of the sleeve 12. This again, causes penetration of the stem head 6 into the sleeve 12, as can be seen at reference numeral 42. This penetration is also part of the sealing effect.

Concomitant with the above contact between the stem head 6 and sleeve 12, is contact between the other side (right-hand side of FIG. 10) of the sleeve 12 and tapered face 30 of nose piece 400. Again, because the material of the nose piece 400 is harder (in this example, hardened steel) than that of the sleeve 12, deformation of the right-hand side of the sleeve 12 occurs. Due to the convex shape of the tapered face 30 (as seen by the sleeve 12), the deformation of the sleeve here causes material flow of the sleeve 12 to commence from its radially inner portion 44 (which first contacts the tapered face 30) and this sleeve material flow (which is plastic flow) is in a radially outward direction away from the axis B-B. This is shown in FIG. 10(*d*).

It should be understood that the first flow of sleeve material occasioned by movement of the stem 200 is that caused by the shape of the nose piece taper 30. In other words, the radially outward plastic flow of sleeve 12 material (at the right-hand side of sleeve 12) is the first flow. The effect of this is to push the sleeve 12 material flowing radially outwardly into contact with the inner surface of the hole 34, thereby preventing any axial movement of the sleeve 12 within the hole 34 at a region labelled 35. Any axial slipping of the sleeve 12 within hole 34 during the setting process (which has been known to occur in prior art sealing plug setting operations where deformation of the sleeve occurs firstly from the distal end of the sleeve) is to be avoided, as this can compromise the integrity of the finished sealing surface provided at the interface of the sleeve 12 and the hole 34 surface.

Continued movement of the stem 200 toward the setting tool 600 induces continued flow of sleeve material (which flow has commenced from the right-hand side of sleeve 12 and progresses from there towards the left-hand side). This hole-filling action is due to the sleeve 12 contacting the inside surface of hole 34 progressively from right to left, as the stem head 6 moves from left to right. The next flow is that of radial expansion (radially outward) due to the sleeve 12 being squeezed within the hole 34 between the tapered face 30 and the stem head 6. As axial movement of the sleeve 12 is not possible at its right-hand end (due to contact with the setting tool nose piece front face 30), the material of the sleeve 12 expands radially to fill the hole 34 as the sleeve material reaches and contacts the inner surface of hole 34 at position 48.

The final radial movement of the sleeve 12 is at the left-hand side thereof where it is in contact with the stem head 6. The radial movement here, due to the taper 50 formed on the stem central region 4 from its maximum diameter to its minimum diameter 18, is inwardly towards the axis B-B. It will be appreciated that, as the outer part of the sleeve 12 is already in contact with the inner part of hole 34 at both regions 35 and 48, the sleeve material flow at this stage is into the gap 52 formed between the taper 50 and inside of sleeve 12. This is because of both the taper 50 and also the angle α of the stem head shoulder 20. The combined effect of these two features is to force plastic flow of sleeve material radially inward into gap 52 and the recess between the surface 22 and the left-hand end of sleeve 12.

Figure 11:
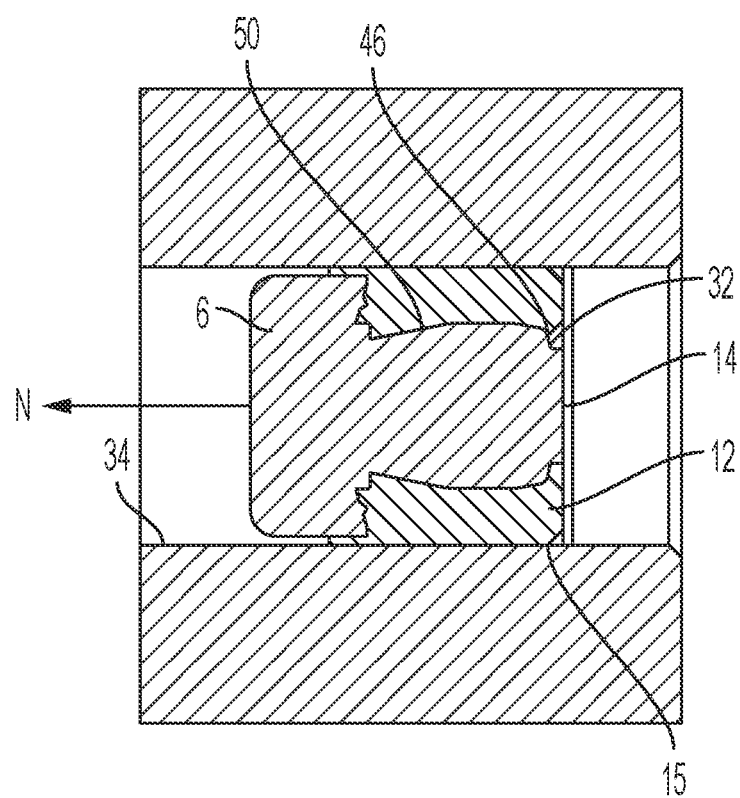
FIG. 11 shows the installed sealing plug.

The inward radial movement here completes the sealing of the hole 34 by the sleeve 12 and continued axial force applied to the stem projection 2 by the nose piece 400 causes the strain limit (appreciated by those skilled in the art) to be reached at the breakneck 14, at which point the stem projection 2 snaps, leaving the set plug sealed within the hole 34, as shown in FIG. 11.

Figure 12:
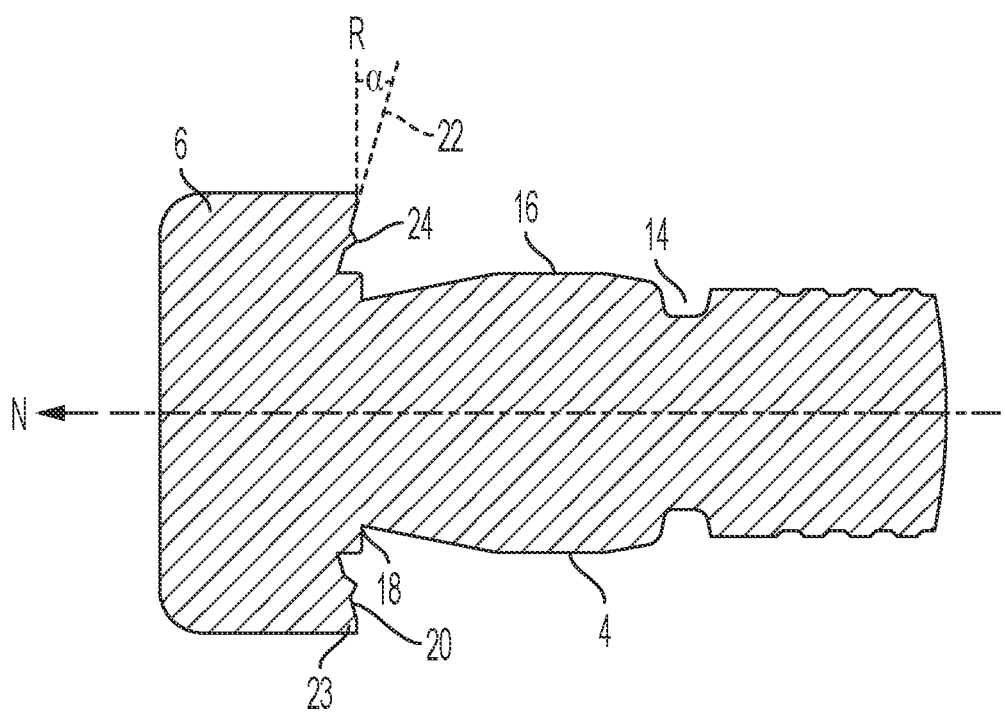
FIG. 12 shows an alternative stem head in accordance with the present invention including an annular projecting ring.

It will be appreciated that the optional addition of an annular projection 24, in this example an annular ring formed with an acute peak profile, as shown in FIG. 12, may further serve, during the setting operation, to displace sleeve 12 material both radially outward to seal hole 34 and radially inwards to seal upon inner shoulder 21 and taper 50. Additionally, the annular projection 24 may provide an extended sealing surface between the stem head 6 and the sleeve 12 end (abutting the stem head 6) for enhanced fluid leak resistance.

It will be appreciated by those skilled in the art that the presence of annular projection 24 is preferable, but not essential, for utility of the present invention. It can be seen that, where present on the shoulder 20, annular projection 24 is for the same purpose as that disclosed in EP-A-1,440,272, namely, so that the annular projection 24 penetrates into the material of the sleeve 12 during setting of the sealing plug, thereby to create an additional and effective fluid-tight seal between the head 6 and sleeve 12 in the blind hole. Penetration of the annular projection 24 into the material of the sleeve 12 is possible due to the material of the head 6 being harder than that of the sleeve 12, as explained above.

During setting of the sealing plug in the example described above, it will be understood that the high axial force (in this example 17.5 kN to seal an 8 mm diameter hole 34) applied to the sleeve 12 by the stem head 6 results in effective axial containment of the sleeve material within the hole 34 and the static tapered nose piece 30, due to high (radial pressure may peak at 200 MPa and after fracture of the breakneck 14, residual stress is of the order 100 MPa) resultant radial stresses. These stresses serve to provide an effective seal between the hole 34 and the sleeve 12 and also between the sleeve 12 and the stem 200 surfaces (6, 50 and 46) so as to provide a leak-proof plug.

The close fit of the stem head 6 within the hole 34 additionally serves to minimise the escape of sleeve 12 material around the outer rim of the shoulder 23. Annular projections, such as 24, formed on the inner shoulder 21 or outer rim 23, serve to embed and provide separate sealing features of the stem head 6 against the sleeve 12 and thereby prevent leakage through the installed sleeve 12 bore. Equally the close fit of the nosepiece conical front face 30 within the hole 34 limits the escape of sleeve 12 material around this nosepiece front face 30 and towards the setting tool 600.

Fracture of the breakneck 14 results in a recoil force acting to urge the remaining stem 200 portion within the sleeve 12 towards the left, as indicated by arrow "N" in FIG. 12 in a manner that is well-known to those skilled in the art. However, the intimate contact formed between the taper 50 on the stem 200 and the radially inner compressed sleeve 12 material which has flowed into gap 52 ensures that there is no relative axial movement which may serve to reduce the effectiveness of the seal formed between the outer surface of the sleeve 12 and the hole 34. This taper 50 also serves to preserve the integrity of the seal if the end of the stem 200 is later subject to accidental impact by an external object or by deliberate tampering.

Whilst in the above examples, the stem 200 has been shown to carry a series of annular grooves 10 along its axial extent, there are alternatives available to those skilled in the art. For example, the external surface of the stem 200 could be formed with a spiral groove. In this case, the nosepiece 400 of the setting tool 600 would also carry a complimentary spiral groove for rotational engagement with the external spiral groove of the stem, thereby to enable the tool 600 to move the stem 200 relative to the sleeve 12, to effect installation of the plug in known manner. Indeed, it will be appreciated that the stem could carry, for example, a female screw thread and the setting tool 600 a complimentary male one. However, there is also no requirement for the outer surface of the stem to carry any profile at all.

Those skilled in the art will appreciate that the breakneck 14 is not necessary for the present invention. As an example of an alternative, the tool 600 may exert a predetermined pull force on the stem 200 and then be simply detached from the stem. Such is possible by, for example, a spin-pull tool engaging with a spiral groove outer surface formed on the outer surface 2.

LIST OF FEATURES 200 stem
400 nosepiece
600 setting tool
2 proximal cylindrical projection
4 central region
6 distal head end
8 tapering end of stem
10 stem annular grooves
12 sleeve
13 front tapered region
14 weakened zone for breakstem
15 rear tapered region
16 maximum diameter of central region 4
18 minimum diameter of central region
20 annular shoulder
21 inner shoulder
22 surface of shoulder 20
23 outer rim of shoulder
24 annular projection
26 diameter difference between head and sleeve
28 stem head rounding
30 nosepiece front face
32 gap between nosepiece and sleeve
34 blind hole
35 region of first sleeve material flow
36 workpiece in which hole 34 is formed
38 front member of nosepiece
42 penetration of head 6 into sleeve 12
44 sleeve radially inner portion
46 radially inner part of sleeve 12
48 contact point between hole 34 and sleeve
50 internal stem taper
52 gap between inner of sleeve 12 and stem taper 50

What is claimed is:

1. A sealing plug for blind installation within a hole in a workpiece, thereby to plug and seal the hole, the sealing plug that includes a stem having a distal stem head where the stem head is disposed within the hole in order to seal against passage of fluid through the hole from one side of the plug to the other, the sealing plug comprising:

a generally cylindrical hollow sleeve defining a first axis (A-A) and having a given outer diameter;

the stem including a proximal cylindrical projection, the stem central portion located between the proximal cylindrical projection and the distal head, the stem head having an outer diameter which is greater than the outer diameter of the central portion, and wherein the outer diameter of the central portion is greater than the outer diameter of the stem proximal cylindrical projection, and wherein the stem defines a second axis (B-B);

the stem head having an annular shoulder adjacent the stem central portion, which annular shoulder is inclined at an acute angle (a) relative to a radius to the second axis (B-B);

the stem head being formed of a material which is harder than the material of the sleeve;

an inner shoulder disposed between the stem and the stem head;

the stem central portion, when within the sleeve, is arranged to be held therewithin by frictional engagement between an outer part of the stem central portion and an inner part of the sleeve such that the first and second axes are co-axial;

wherein the outer diameter of the stem central portion tapers in the direction from the stem proximal cylindrical projection to the stem head, with respect to the axis of the stem, to a minimum central portion diameter at the point where the stem central portion meets the shoulder.

2. The sealing plug of claim 1, wherein the annular shoulder inclination forms a concave region facing the stem central portion.

3. The sealing plug of claim 1, wherein the anular shoulder angle of inclination relative to a radius to the second axis is between 5° and 25°.

4. The sealing plug of claim 3, wherein the annular shoulder angle of inclination is between 10° and 15°.

5. The sealing plug of claim 4, wherein the annular shoulder angle of inclination is 14°.

6. The seal plug of claim 1, wherein the stem head has formed thereon an annular projection facing the stem central portion.

7. The sealing plug of claim 6, wherein the annular projection is arranged to engage with the hollow sleeve.

8. The sealing plug of claim 1, wherein stem central region is formed with an axial taper narrowing in a direction toward the proximal cylindrical projection from the distal head.

* * * * *